United States Patent
Fuchigami

(10) Patent No.: US 7,386,172 B2
(45) Date of Patent: Jun. 10, 2008

(54) IMAGE RECOGNITION METHOD

(75) Inventor: Takahiro Fuchigami, Yokosuka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 523 days.

(21) Appl. No.: 11/076,848

(22) Filed: Mar. 11, 2005

(65) Prior Publication Data

US 2006/0204105 A1      Sep. 14, 2006

(51) Int. Cl.
*G06K 9/46*     (2006.01)
*G06K 9/62*     (2006.01)

(52) U.S. Cl. .................................. 382/201; 382/209
(58) Field of Classification Search ............... 382/181, 382/190, 192, 195, 201, 209
See application file for complete search history.

(56) References Cited

U.S. PATENT DOCUMENTS

| | | | |
|---|---|---|---|
| 6,870,958 B2* | 3/2005 | Murakawa et al. | 382/195 |
| 6,928,190 B2* | 8/2005 | Namikata | 382/218 |
| 7,190,834 B2* | 3/2007 | Davis | 382/181 |
| 2002/0027671 A1* | 3/2002 | Namikata | 358/1.9 |
| 2004/0212838 A1 | 10/2004 | Yamamoto et al. | |
| 2004/0234134 A1 | 11/2004 | Fuchigami | |

FOREIGN PATENT DOCUMENTS

JP          2893080 B2      3/1999

* cited by examiner

*Primary Examiner*—Colin LaRose
(74) *Attorney, Agent, or Firm*—Foley & Lardner LLP

(57) ABSTRACT

In a pattern recognition section of a digital color copying machine, a position analysis section successively selects, in units of a predetermined number, position data of rectangular regions stored in a position information memory, calculates distances between the rectangular regions, and determines whether a combination of the distances coincides with that of a pattern to be detected. If the combination of distances coincides with that of the pattern to be detected, the position analysis section outputs to a rear-stage page memory a control signal for resetting the page memory.

4 Claims, 2 Drawing Sheets

IMAGE RECOGNITION METHOD

BACKGROUND OF THE INVENTION

1. Field of the Invention

The present invention relates to an image recognition method for recognizing an image of a predetermined pattern in an image forming apparatus such as a digital color copying machine.

2. Description of the Related Art

In the prior art, in general, pattern matching is executed for the entirety of a pattern to be detected, with respect to input image data.

As regards a method of detecting a copy-protection mark, Japanese Patent No. 2893080, for instance, discloses a method wherein a plurality of small marks with the same shape are detected from an input image, and a copy-protection mark is determined on the basis of the number of small marks that are present on an outline of a certain figure.

However, in the case of the matching with respect to the entirety of the to-be-detected pattern, if the size of the entire pattern is large, the amount of computations would become enormous.

In the case of counting the number of small marks with the same shape, which are present on the outline of the figure, if the shape of the outline is complex, it is likely that the uniqueness of the to-be-detected pattern cannot be maintained.

BRIEF SUMMARY OF THE INVENTION

The object of an aspect of the present invention is to provide an image recognition method that can easily and quickly detect a predetermined figure or pattern from input image data.

According to an aspect of the present invention, there is provided an image recognition method for detecting a specific pattern in input image data, comprising: detecting, from the input image data, regions similar to a predetermined number of characteristic regions that are structural components of the specific pattern; storing position information of each of the detected characteristic regions; calculating distance values corresponding to distances between the detected characteristic regions, on the basis of the stored position information; determining whether the calculated distance values between the characteristic regions coincide with associated predetermined distance values or fall within an associated predetermined range; and determining that a region including the predetermined number of characteristic regions is a region of the specific pattern in a case where there is a combination of a predetermined number of characteristic regions, in which results of determination of distances are all true.

Additional objects and advantages of an aspect of the invention will be set forth in the description which follows, and in part will be obvious from the description, or may be learned by practice of the invention. The objects and advantages of an aspect of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate preferred embodiments of the invention, and together with the general description given above and the detailed description of the embodiments given below, serve to explain the principles of an aspect of the invention.

DETAILED DESCRIPTION OF THE INVENTION

An embodiment of the present invention will now be described with reference to the accompanying drawings.

Figure 1:
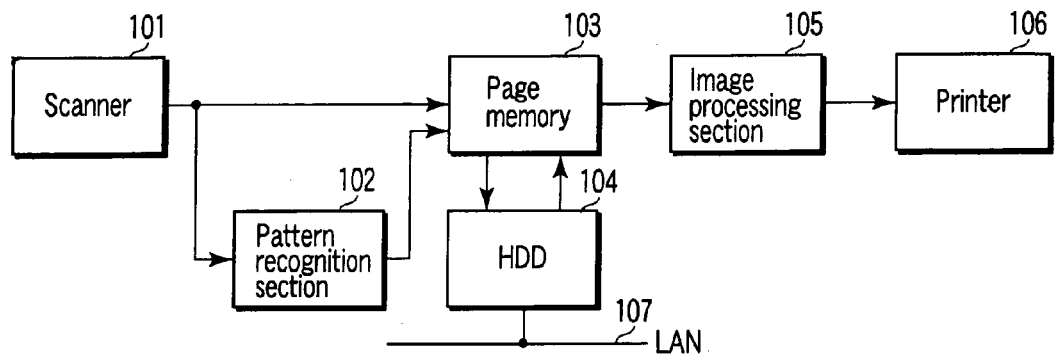
FIG. 1 is a block diagram that schematically shows the structure of a digital color copying machine relating to an image recognition method of the present invention.

FIG. 1 schematically shows the structure of a digital color copying machine relating to an image recognition method of the present invention. The digital color copying machine comprises a scanner 101, a pattern recognition section 102, a page memory 103, a hard disk drive (HDD) 104, an image processing section 105 and a printer 106.

The scanner 101 reads an image (RGB image) on an original.

The pattern recognition section 102 detects a predetermined pattern, as will be described later in detail.

The page memory 103 temporarily stores image data in units of a page.

The HDD 104 stores image data. The HDD 104 is connected to a LAN (Local Area Network) 107 via a network interface (not shown).

The image processing section 105 executes various processes for image data.

The printer 106 forms an image on paper on the basis of the image data.

Next, the operation of the digital color copying machine with the above-described structure is described.

Image (RGB image) data on an original, which is read by the scanner 101, is input to the pattern recognition section 102 and a predetermined pattern (e.g. a copy-protection mark) is detected.

If such a predetermined pattern is not detected by the pattern recognition section 102, the image data is successively stored in the page memory 103. If the predetermined pattern is detected by the pattern recognition section 102, the page memory 103 is reset at this point in time.

When all image data is stored in the page memory 103, the image data is downloaded in the HDD 104, where necessary. In this case, transmission/reception of image data can be executed with a server PC or a client PC, which is connected to the LAN (Local Area Network).

Image data that is stored in the page memory 103 (including image data uploaded from the HDD 104) is input to the image processing section 105 and subjected to various processes. The processed image data is input to the printer 106. The printer 106 executes printing on paper on the basis of the input image data.

Figure 2:
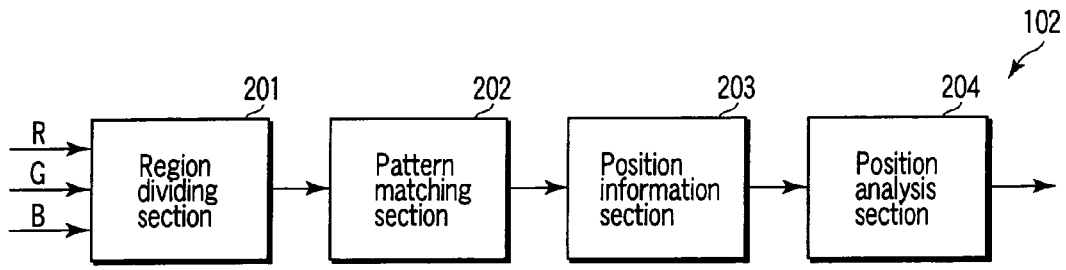
FIG. 2 shows process blocks of a pattern recognition section.

FIG. 2 shows process blocks of the pattern recognition section 102 according to the present invention. The pattern recognition section 102 comprises a region dividing section 201, a pattern matching section 202, a position information memory 203, and a position analysis section 204.

The region dividing section 201 extracts a pixel of a specified color by setting an upper limit value and a lower limit value of each of R, G and B values with respect to each of pixels of the input RGB image signal (image data).

The pattern matching section 202 buffers an output signal from the region dividing section 201 in a FIFO (First In First Out) memory (not shown) for an N-number of lines, and cuts out a rectangle of M×N pixels. In addition, the pattern matching section 202 successively finds similarity between the rectangle and a prestored template image of M×N pixels, and executes determination by comparison with a predetermined threshold.

As regards the similarity, a value S that is expressed by the following formula (1), for instance, is widely used.

$$S = \frac{\sum_{i=0}^{N-1}\sum_{j=0}^{M-1} P_{i,j} \times PT_{i,j}}{\sqrt{\sum_{i=0}^{N-1}\sum_{j=0}^{M-1} P_{i,j}^2} \times \sqrt{\sum_{i=0}^{N-1}\sum_{j=0}^{M-1} PT_{i,j}^2}} \quad (1)$$

where $P_{i,j}$ and $PT_{i,j}$ are representative of pixel values of the cut-out region from the input image and the template image.

If a result of the determination indicates coincidence with the template, the pattern matching section 202 stores the coordinate value of the upper left pixel of the rectangle in the position information memory 203.

The position analysis section 204 successively selects, in units of a predetermined number, position data stored in the position information memory 203. Thus, the position analysis section 204 calculates distances between the respective rectangular regions, and determines whether a combination of distances agrees with that of a to-be-detected pattern. If the combination of distances agrees with that of the to-be-detected pattern, the position analysis section 204 outputs a control signal for resetting the rear-stage page memory 103 to the page memory 103.

Figure 3:
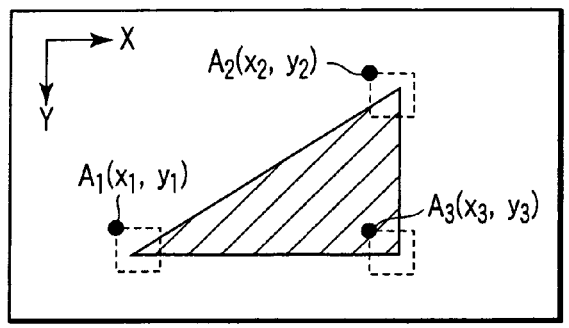
FIG. 3 shows an example of a pattern to be detected.
Figure 4:
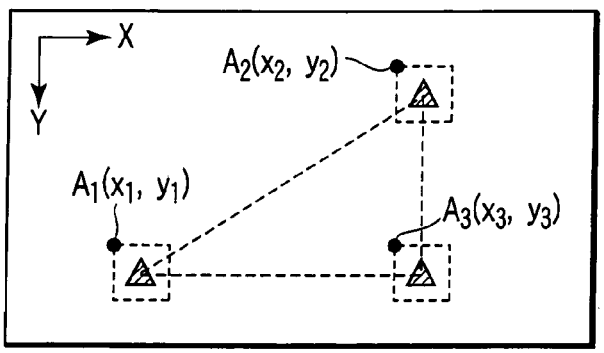
FIG. 4 shows an example of a pattern to be detected.

FIGS. 3 and 4 show examples of to-be-detected patterns. In the example of FIG. 3, parts of a large figure are characteristic regions. In the example of FIG. 4, small figures are characteristic regions and a pattern of the small figures combined is an object of detection. In each case, the number of characteristic regions is three and, accordingly, the number of distances between the-characteristic regions is three. By analyzing the degree of coincidence between the vectors whose components are these distances, pattern detection is executed.

In the above case, the number of characteristic regions and the number of orders of the vector of distances are "3" by way of example. In general terms, when the number of characteristic regions is L, the number of orders of the vector of distances is "$_LC_2$". The number "$_LC_2$" represents the number of combinations in the case of selecting two of an L-number of samples.

Figure 5:
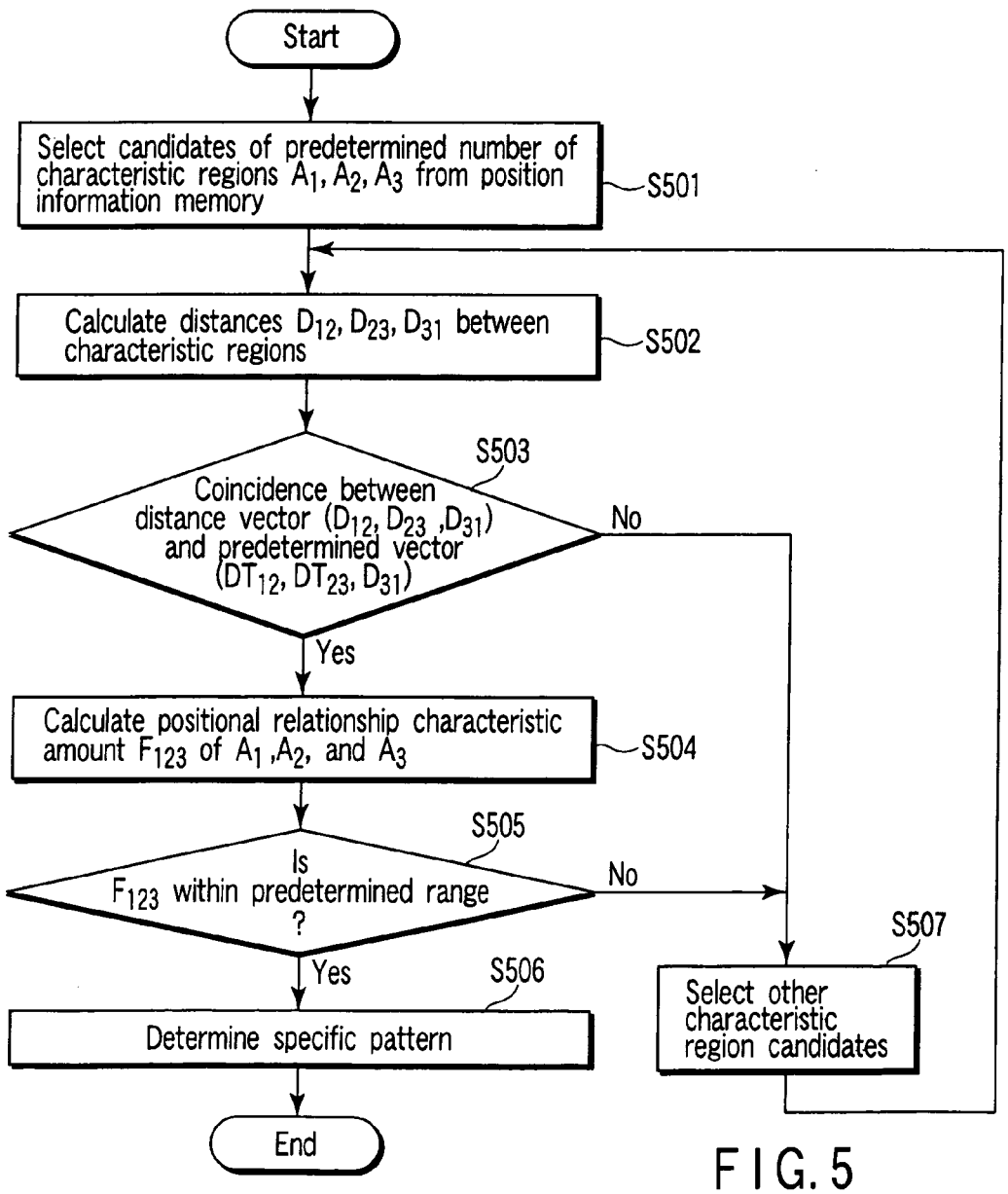
FIG. 5 is a flow chart illustrating a processing operation of a position analysis section.

Referring now to the flow chart of FIG. 5, the processing operation of the position analysis section 204 is described.

The position analysis section 204 selects a predetermined number (three in this example) of characteristic region candidates $A_1$, $A_2$ and $A_3$ from position data that are stored in the position information memory 203 (S501).

The position analysis section 204 calculates distances $D_{12}$, $D_{23}$ and $D_{31}$ between the regions on the basis of coordinate values of the selected characteristic region candidates by the following equation (2) (S502):

$$D_{ij} = \sqrt{(x_i-x_j)^2+(y_i-y_j)^2} \quad (2)$$

where $(x_i, y_i)$ and $(x_j, y_j)$ are coordinate values of the characteristic region candidates $A_i$, $A_j$ (i, j=an integer).

The position analysis section 204 constitutes a distance vector ($D_{12}$, $D_{23}$, $D_{31}$) on the basis of the calculated distances, and determines the degree of coincidence between the distance vector and a predetermined vector ($DT_{12}$, $DT_{23}$, $DT_{31}$).

Possible determination methods are as follows.

a. Differences between respective elements are compared with predetermined thresholds, and a logical product of determination results is found.

$(D_{12}<TH_{12})\cap(D_{23}<TH_{23})\cap(D_{31}<TH_{31}) \Rightarrow$ coincidence.

b. A sum of squares of differences between respective elements is calculated, and coincidence is determined if the sum is less than a predetermined threshold.

$\{(D_{12}-DT_{12})^2+(D_{23}-DT_{23})^2+(D_{31}-DT_{31})^2\} < TH \Rightarrow$ coincidence.

c. Coincidence is determined if the degree of similarity between a distance vector and a predetermined vector, which is calculated by an equation similar to the above equation (1), is equal to or greater than a predetermined threshold and one of the elements of the distance vector is within a predetermined range.

$[(D_{12} \times DT_{12}+D_{23} \times DT_{23}+D_{31} \times DT_{31})/\{\sqrt{(D_{12}^2+D_{23}^2+D_{31}^2)} \times \sqrt{(DT_{12}^2+DT_{23}^2+DT_{31}^2)}\}] \geq TH$ (MIN$_{12} \leq D_{12} \leq$ MAX$_{12}$)$\Rightarrow$coincidence.

When the determination result is "coincidence", the position analysis section 204 calculates a positional relationship characteristic amount $F_{123}$ from the coordinate values of the three characteristic regions by the following equation (3):

$$F_{123}=(x_2-x_1)(y_3-y_1)-(y_2-y_1)(x_3-x_1) \quad (3)$$

This equation expresses a position of point $A_3$ relative to straight line $A_1A_2$.

The position analysis section 204 compares the positional relationship characteristic amount $F_{123}$ with a predetermined threshold (S505). Thereby, the obverse/reverse side of the pattern can be determined.

Specifically, a positive value is obtained in the case of the positional relationship as shown in FIG. 3 or FIG. 4. A negative value is obtained in the case of a pattern, which may be formed by reversing the pattern shown in FIG. 3 or FIG. 4.

If the determination result in each of step S503 and step S505 is true, the position analysis section 204 finally determines the specific pattern (S506).

If the determination result in either step S503 or step S505 is false, the position analysis section 204 repeats the process of steps S502 to S507 by selecting another combination of characteristic region candidates from the position information memory 203.

As has been described above, according to the embodiment of the present invention, the pattern matching is executed only with respect to the characteristic regions. Thereby, the amount of arithmetic operations can remarkably be reduced.

A more complex pattern can be detected, compared to the method in which the number of small marks that are present on an outline figure is counted.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image recognition method for detecting a specific pattern in input image data, comprising:

detecting, from the input image data, regions similar to a predetermined number of characteristic regions that are structural components of the specific pattern;

storing position information of each of the detected characteristic regions;

calculating distance values corresponding to distances between the detected characteristic regions, on the basis of the stored position information;

calculating a degree of coincidence between a vector, which is formed by selecting a predetermined number of values from the calculated distance values between the characteristic regions, and a predetermined reference vector having the same number of orders;

determining whether a region including the predetermined number of characteristic regions is a region of the specific pattern by comparing the calculated degree of coincidence with a predetermined threshold;

calculating a value corresponding to an inner product of the two vectors when the degree of coincidence between the two vectors is calculated;

calculating values corresponding to magnitudes of the two vectors; and dividing the value corresponding to the inner product by a product of the values corresponding to the two magnitudes.

2. The image recognition method according to claim 1, further comprising selecting at least one element from the vector to be determined, and determining whether a difference between the selected element and a corresponding element of a predetermined reference vector is within a predetermined range.

3. The image recognition method according to claim 2, further comprising:

selecting three of the predetermined number of characteristic regions, and calculating a characteristic amount that represents a positional relationship between the three characteristic regions; and comparing the calculated characteristic amount with a predetermined threshold, and executing determination of the specific pattern.

4. The image recognition method according to claim 1, further comprising:

selecting three of the predetermined number of characteristic regions, and calculating a characteristic amount that represents a positional relationship between the three characteristic regions; and comparing the calculated characteristic amount with a predetermined threshold, and executing determination of the specific pattern.

* * * * *